United States Patent
Hundley

(10) Patent No.: US 7,430,652 B2
(45) Date of Patent: Sep. 30, 2008

(54) DEVICES FOR PERFORMING MULTIPLE INDEPENDENT HARDWARE ACCELERATION OPERATIONS AND METHODS FOR PERFORMING SAME

(75) Inventor: Douglas Edward Hundley, Poway, CA (US)

(73) Assignee: Tarari, Inc., San Diego, CA (US)

( * ) Notice: Subject to any disclaimer, the term of this patent is extended or adjusted under 35 U.S.C. 154(b) by 372 days.

(21) Appl. No.: 10/403,419

(22) Filed: Mar. 28, 2003

(65) Prior Publication Data

US 2005/0278502 A1    Dec. 15, 2005

(51) Int. Cl.
G06F 15/00 (2006.01)
G06F 15/76 (2006.01)

(52) U.S. Cl. ........................................ 712/34
(58) Field of Classification Search ............ 712/34
See application file for complete search history.

(56) References Cited

U.S. PATENT DOCUMENTS

| | | | | |
|---|---|---|---|---|
| 4,862,407 A | * | 8/1989 | Fette et al. | 712/35 |
| 5,909,565 A | * | 6/1999 | Morikawa et al. | 712/200 |
| 6,002,881 A | * | 12/1999 | York et al. | 712/34 |
| 6,608,928 B1 | * | 8/2003 | Queiroz | 382/173 |
| 6,782,445 B1 | * | 8/2004 | Olgiati et al. | 711/100 |
| 6,842,849 B2 | * | 1/2005 | Hinds et al. | 712/217 |
| 6,944,752 B2 | * | 9/2005 | Burch | 712/219 |

* cited by examiner

*Primary Examiner*—Eddie P Chan
*Assistant Examiner*—Brian P Johnson
(74) *Attorney, Agent, or Firm*—Knobbe Martens Olson & Bear, LLP

(57) ABSTRACT

Multiple hardware accelerators can be used to efficiently perform processes that would otherwise be performed by general purpose hardware running software. The software overhead and bus bandwidth associated with running multiple hardware acceleration processes can be reduced by chaining multiple independent hardware acceleration operations within a circuit card assembly. Multiple independent hardware accelerators can be configured on a single circuit card assembly that is coupled to a computing device. The computing device can generate a playlist of hardware acceleration operations identifying hardware accelerators and associated accelerator options. A task management unit on the circuit card assembly receives the playlist and schedules the hardware acceleration operations such that multiple acceleration operations may be successively chained together without intervening data exchanges with the computing device.

13 Claims, 8 Drawing Sheets

DEVICES FOR PERFORMING MULTIPLE INDEPENDENT HARDWARE ACCELERATION OPERATIONS AND METHODS FOR PERFORMING SAME

BACKGROUND OF THE INVENTION

1. Field of the Invention

The invention relates generally to electronic data processing. More particularly, the invention relates to hardware acceleration or co-processing.

2. Description of the Related Art

Data processing hardware, such as computers and personal computers, often utilizes one or more processors performing tasks defined in software. Such data processing hardware often uses hardware accelerators that perform specific tasks more efficiently than could be performed by the processors running a software routine. One aspect of hardware acceleration is that algorithmic operations are performed on data using specially designed hardware rather than performing those same operations using generic hardware, such as software running on a microprocessor. Thus, a hardware accelerator can be any hardware that is designed to perform specific algorithmic operations on data. Hardware accelerators generally perform a specific task to off-load CPU (software) cycles. This is accomplished by transferring the data that requires processing into the domain of the hardware accelerator (usually a chip or a circuit board assembly), performing the hardware accelerated processing on that data, and then transferring the resultant data back into the software domain.

The process of transferring the input/output data from the software domain to the hardware domain and back requires memory-hardware data copying. This copying may be performed in several ways. For example, a processor may copy data from memory in the software domain to memory in the hardware domain. Alternatively, the processor can copy data from memory in the software domain to a buffer location, and a controller in the hardware domain can copy the data from the buffer into memory in the hardware domain. Typically, data copying is performed by hardware units called Direct Memory Access Controllers (DMAC). A DMAC is essentially a data pump that moves data from main memory to a hardware device via an interconnect bus. Common interconnect buses used in PCs and servers are the Advanced Graphics Port (AGP) and the Peripheral Component Interconnect (PCI). Typically, an AGP bus is used for moving graphics data between main memory and a hardware accelerator that is specific to graphics rendering acceleration. The PCI bus is more generic and is used to move data to/from disk drives, local area networks, modems, audio equipment, and other such I/O devices.

Interconnect buses have a finite amount of bandwidth. That is, they have a data movement capacity that is limited to a certain number of bits per second. Consequently, moving a given amount of data across such an interconnect requires a finite amount of time. For example, given a bus that has the capacity (bandwidth) of c bits per second, the time t required to move b bits of data is t=b/c. Clearly, transfer time increases as the number of bits to be transferred increases.

One goal of hardware acceleration is to perform algorithmic operations in dramatically less time than can be performed using the standard software/CPU method. An impediment to achieving a high degree of hardware acceleration is the transfer time between the software and hardware domain. Often, this problem is exacerbated when multiple operations need to be performed by independent hardware accelerators. In the past, this required multiple transfers between the hardware and software domains. With each transfer, time is consumed during the actual transfer and during the hardware/software synchronization that must follow. Moving data across an I/O bus consumes time. Hardware/software synchronization consumes time.

In prior art systems, for each hardware acceleration operation that is to be performed, software must organize the data to be processed, initiate the data transfer across the I/O bus, and synchronize with hardware. After hardware processing, the hardware and software domains must again synchronize and initiate the data transfer across the I/O bus.

Another related impediment to achieving the highest degree of hardware acceleration is that a hardware accelerator cannot perform at peak capacity if it cannot receive and send data at a rate commensurate with its processing speed. Should the interconnect bus lack the capacity to "feed" data to the accelerator or pull data from the accelerator at its peak rate, the accelerator will have to reduce its performance accordingly.

Thus, it would be a valuable improvement in the art to provide a method and apparatus that minimizes the bus transfers related to multiple hardware acceleration processes. It would be a further improvement to decrease the amount of software control and supervision required to perform multiple hardware acceleration processes.

SUMMARY OF THE INVENTION

One aspect of the invention is a method and apparatus for reducing overall hardware/software data transit latency, for reducing the CPU cycles required to manage the hardware acceleration operations, and for preserving interconnect bandwidth by allowing multiple independent hardware acceleration operations to be "chained" without the transfer of intermediate data between hardware/software domains, and without any intermediate synchronization between hardware and software.

Another aspect of the invention is a means and a structure for allowing multiple successive operations to be performed completely within the hardware domain without intermediate software intervention and with a single round trip of the data across the I/O bus.

Another aspect of the invention is a method and apparatus that reduces software overhead. A means and a structure is disclosed for allowing multiple successive operations to be performed without software intervention, thus reducing the overhead to be substantially that of a single hardware acceleration operation.

Another aspect of the invention is a method and apparatus which reduces the processing latency (processing start to processing complete time) for multiple acceleration operations. The method and apparatus limits the number of data moves and hardware/software synchronizations to that of a single hardware acceleration operation. Thus, multiple successive hardware acceleration operations can be performed in dramatically less time than when performed by prior art systems and methods.

These and other aspects and features of the invention will become more fully apparent from the following description and appended claims taken in conjunction with the following drawings, where like reference numbers indicate identical or functionally similar elements.

DETAILED DESCRIPTION OF EMBODIMENTS OF THE INVENTION

In the following description, reference is made to the accompanying drawings, which form a part hereof, and which show, by way of illustration, specific examples or processes in which the invention may be practiced. Where possible, the same reference numbers are used throughout the drawings to refer to the same or like components. In some instances, numerous specific details are set forth in order to provide a thorough understanding of the invention. The invention, however, may be practiced without the specific details or with certain alternative equivalent devices and/or components and methods to those described herein. In other instances, well-known methods and devices and/or components have not been described in detail so as not to unnecessarily obscure aspects of the invention.

Figure 1:
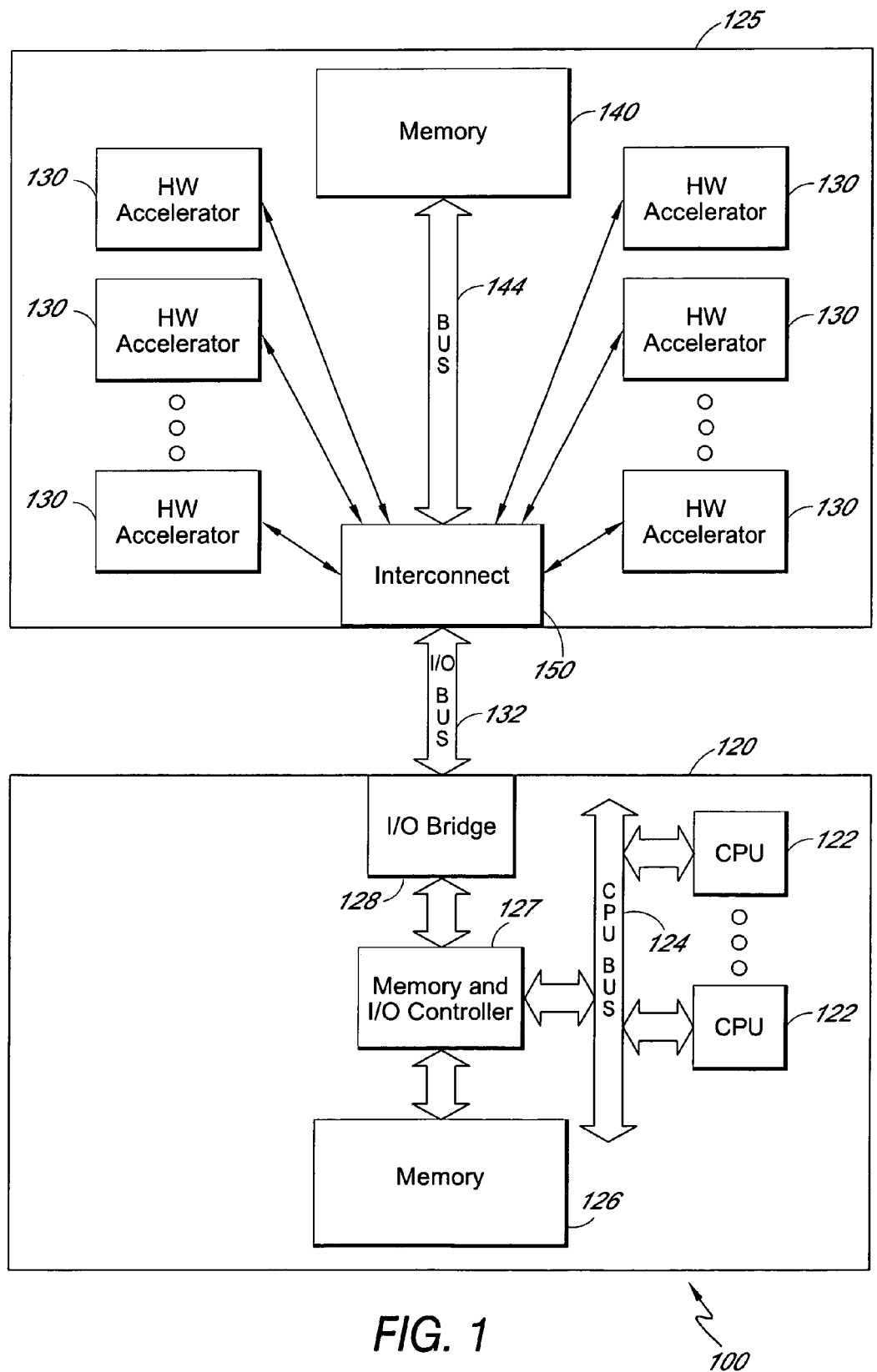
FIG. 1 is a functional block diagram illustrating a computing system including a computing device and coupled to a circuit card assembly.

FIG. 1 is a functional block diagram illustrating a computing system 100 including a computing device 120 coupled to a circuit card assembly 125. The computing device 120 may be any type of computing device known in the industry. The computing device 120 typically includes one or more processors 122 connected via a bus 124 to an I/O controller 127. The I/O controller 127 can, in turn, connect the processors 122 to a memory 126 and an I/O bridge 128.

The computing device 120 executes software that is written to perform one or more functions required for the system's intended purpose. Thus, the computing device 120 is said to operate in the software domain. The computing device 120 is coupled to the circuit card assembly 125 via an I/O bus 132. The computing device 120 may also be coupled to additional peripheral devices that are not shown in FIG. 1. For example, the computing system 100 typically is coupled to a number of peripheral devices, such as a monitor, keyboard, mouse, and other, peripheral devices.

The circuit card assembly 125 comprises multiple hardware accelerators 130 all occupying a fraction of the logic space available on a circuit card assembly. The logic space consumed by the hardware accelerators 130 may be implemented in a variety of methods, including Field Programmable Gate Arrays (FPGAs), Application Specific Integrated Circuits (ASICs), and/or Full Custom Integrated Circuits, or in any other method known in the art. The use of hardware accelerators 130 increases the overall performance of the system 100 by executing certain algorithmic operations directly using application specific hardware. Thus, the circuit card assembly is said to operate in the hardware domain. Often, hardware accelerators 130 can perform algorithmic operations orders of magnitude faster than software running on a general-purpose computing device 120. However, certain operations are not accelerated significantly by direct hardware implementation and, thus, overall system performance may be optimized using a combination of software running on a computing device 120 and hardware accelerators 130.

The circuit card assembly 125 also includes a memory 140 connected via a circuit card bus 144 to an interconnect 150. The interconnect 150 couples the circuit card assembly 125 with the computing device 120 via an I/O bus 132. The circuit card assembly also includes a plurality of hardware accelerators 130 that each communicate with the interconnect 150. Each hardware accelerator 130 can have a dedicated communication link to the interconnect 150 or multiple hardware devices 130 can communicate with the interconnect 150 using the circuit card bus 144 or some other bus (not shown).

The circuit card assembly 125 communicates with the computing device 120 via an I/O bus 132 having a finite bandwidth. The bandwidth of the I/O bus is represented by $\beta_{bus}$ and has units of bits per second. The interface 150 may be an AGP or PCI interface, for example, that connects with a slot in the computing device 120, such as a PCI slot on a motherboard. In one embodiment, each of the hardware accelerators 130 performs a different operation on data. In another embodiment, multiple hardware accelerators 130 perform the same operation on data.

Each of the hardware accelerators 130 has an ingress bandwidth $\beta_i$, and an egress bandwidth $\beta_e$. That is, in order for a given hardware accelerator 130 to perform at its peak processing rate, it requires an average ingress rate of $\beta_i$ bits per second and an average egress rate of $\beta_e$ bits per second. Thus, in order for n hardware accelerators 130 to perform at their respective peak performance simultaneously, the total input/output bandwidth required for the system is:

$$\beta_{system} = \beta_{i1} + \beta_{e1} + \beta_{i2} + \beta_{e2} + \ldots \beta_{in} + \beta_{en}.$$

Unless the bandwidth $\beta_{bus}$ of the I/O bus is greater than $\beta_{system}$, one or more of the hardware accelerators will not be able to perform at their peak rate.

In operation, the computing device 100 executes software instructions. The software instructions can direct the computing device to operate on a block of data, such as a file or some other predetermined block of data. The operation can correspond to an operation that is performed by one of the hardware accelerators 130. When the computing device 100 determines that a block of data is to be operated on by one of the hardware accelerators 130, a command to perform the operation is transmitted to the circuit card assembly 125 via the I/O bus 132. For every operation that is to be performed by a hardware accelerator 130, software directs the processor 122 or some other device, such as the I/O controller 127, to organize the memory in its domain such that the data can be copied into the hardware domain. After the memory is properly organized, software executing on the computing device 120 initiates copying of data (using a DMAC or some other means) from the software domain into the hardware domain. The computing device 120 in the software domain synchronizes with the circuit card assembly 125 of the hardware domain so that the hardware accelerator 130 is informed that the data is in its domain and is ready for processing. The minimal set of information that is required for synchronization typically includes: 1) the data location within the hardware domain; 2) how much data is to be processed; 3) what specific operations are to be performed on the input data; and 4) the location where the output data is to be placed (in either the hardware or software domain). Once the synchronization data is provided, the hardware accelerator 130 may process the data, ultimately returning the results to the computing device 120 in the software domain.

All of the time consumed by the computing device 120 in organizing memory, setting up DMAC operations, and synchronizing with the circuit card assemble 125 is overhead. That is, if the algorithmic operation performed by the hardware accelerator 130 were to be executed using software running on the computing device 120, none of these operations would be necessary. Thus, for hardware acceleration to be effective, the overhead associated with moving data and with hardware/software synchronization should be a small fraction of the time it would require to execute the algorithm in software.

Figure 2:
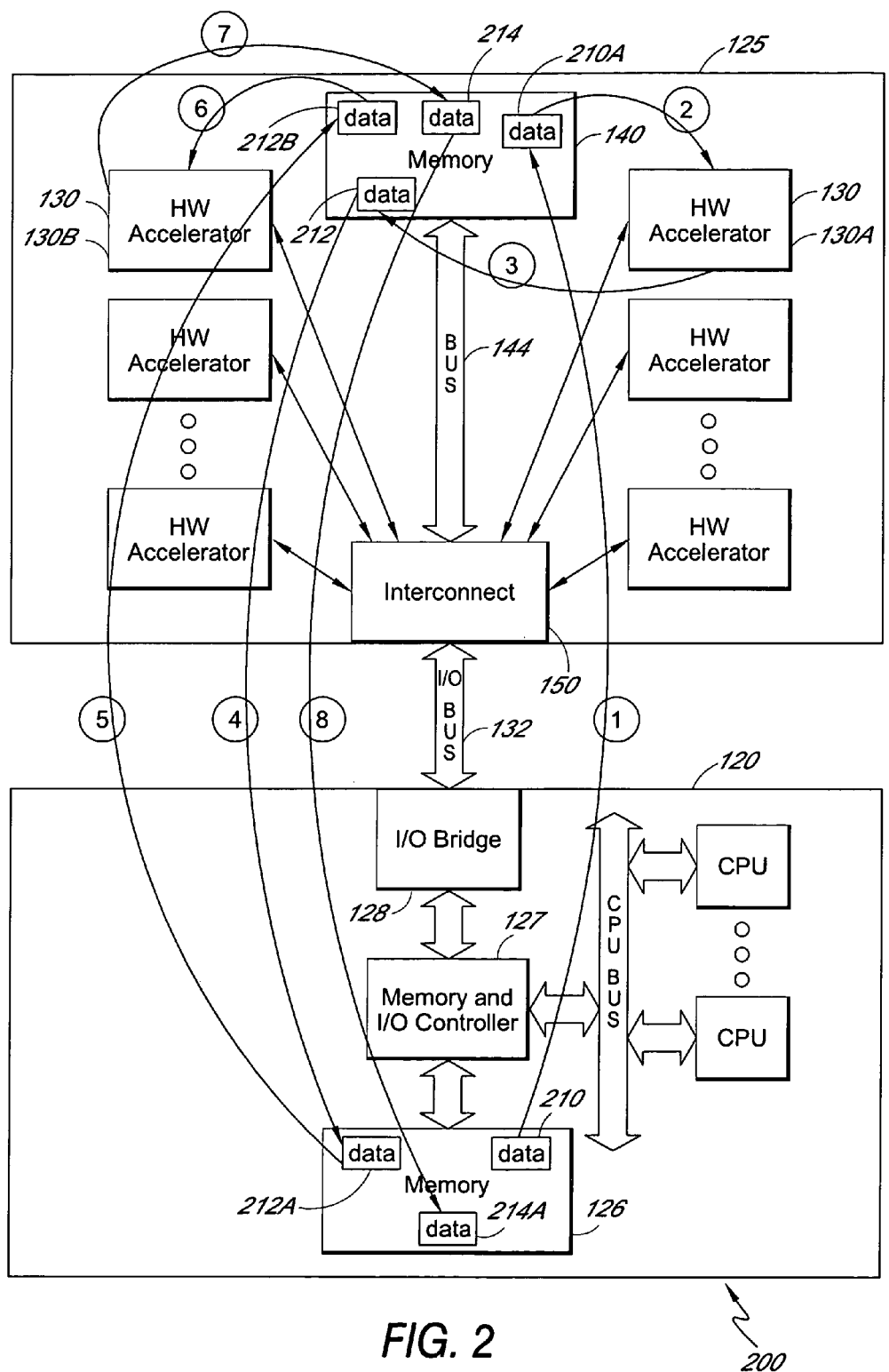
FIG. 2 is a functional block diagram illustrating a computing system including numbered arrows indicating data flow between the computing system and the circuit card assembly.

FIG. 2 illustrates a computing system 200 including numbered arrows indicating a data flow path between the computing system 120 and the circuit card assembly 125. More particularly, the elongated lines with arrowheads indicate data flow between the computing system 120 and the circuit card assembly 125, where the numbers associated with each line are indicative of the order of the data movements. The data movements 1-8 illustrate the movement of data in performing two operations by hardware accelerators ("accelerators") 130A and 130B. In the embodiment of FIG. 2, a round trip data path from the computing device 120 (software domain) to the circuit card assembly 125 (hardware domain) and back is required for each operation performed by one of the accelerators 130. That is, the round trip data path includes the delivery of the data to be processed to the circuit card assembly 125 and the delivery of the processed data back to the computing device 120. In addition, each communication between the computing device 120 and circuit card assembly 125 requires synchronization. A portion of the finite bandwidth of the I/O bus 132 is consumed with each data transfer. Processor cycles are also consumed in communicating and performing synchronization and may be used in performing the data transfer to and from the computing device 120 and the circuit card assembly.

The data flow path shown in FIG. 2 illustrates a prior art data flow path in which the computing device 120 accesses each of the hardware accelerators 130 in succession and receives the data output from a hardware accelerator 130 before initializing the process performed by a different hardware accelerator 130. As shown in FIG. 2, in a first step (step 1) a block of data (also referred to herein as an "input file" or "data") 210 is transmitted from the computing device 120 to the circuit card assembly 125 and stored in the memory as data 210A. The flow of data between the computing device 120 and the circuit card assembly 125 occurs via the I/O bridge 128, I/O bus 132, and interconnect 150. For example, the memory and I/O controller 127 in the computing device 120 can access data 210 stored in a memory location and transmit the data 210 to the I/O bridge 128. The I/O bridge then transmits the data 210 over the I/O bus 132 to the interconnect 150 in the circuit card assembly 125. The interconnect 150 then stores the data as data 210A in memory 140 using the circuit card bus 144.

In step 2, the data 210A is accessed by the accelerator 130A. The hardware accelerator 130A uses data 210A as input data and processes the data to produce output data or an output file. In step 3, the accelerator 130A stores the output file, or other output data, in the memory 140 as data 212. In step 4, the data 212 is transmitted back to the computing device 120 and stored in the memory 126 as data 212A. The interconnect 150 accesses the data 212 in memory 140 and retrieves the data over the circuit card I/O bus 144. The interconnect 150 then transmits the data 212 across the I/O bus 132 to the I/O bridge 128 in the computing device 120. The memory and I/O controller 127 then accesses the data received at the I/O bridge 128 and stores the data as data 212A in memory 126 in the computing device 120. At this point, one operation by an accelerator 130, which in this case is accelerator 130A, has been completed.

In order for a second operation to be performed the data 212A must be re-sent to the circuit card assembly 125 with instructions for operations to be performed by a second accelerator 130. Thus, in step 5, the data 212A is sent to the circuit card assembly 125 and stored in memory 140 as data 212B. The data 212A takes the same functional path as the original data 210. However, the location of the data 212A in memory 126 and the destination of the data 212B in the memory 140 may differ from the locations used for data 210 and 210A. In many cases, the data 212 and 212B are identical blocks of data. That is, the data 212B stored in the memory 140 is identical to the data 212 output from the first hardware accelerator 130A and also stored in memory 140.

In step 6, the data 212B is accessed by the accelerator 130B. The hardware accelerator 130B performs a predetermined process on the data 212B and produces output data or an output file. In step 7, the accelerator 130B stores the output file in the memory 140 as data 214. Finally, in step 8, the data 214 is transmitted back to the computing device 120 via the same route as step 4 and stored in the memory 126 as data 214A. As shown in FIG. 2, in order to perform the two acceleration operations of accelerators 130A and 130B, the block of data is stored in the memory 140 at four different times and locations. Similarly, the block of data is stored in the computing device 120 memory 126 at three different times and locations. Also, in order to perform the operations of two accelerators 130, the data was transmitted across the I/O bus 132 four times, at steps 1, 4, 5, and 8.

Figure 3:
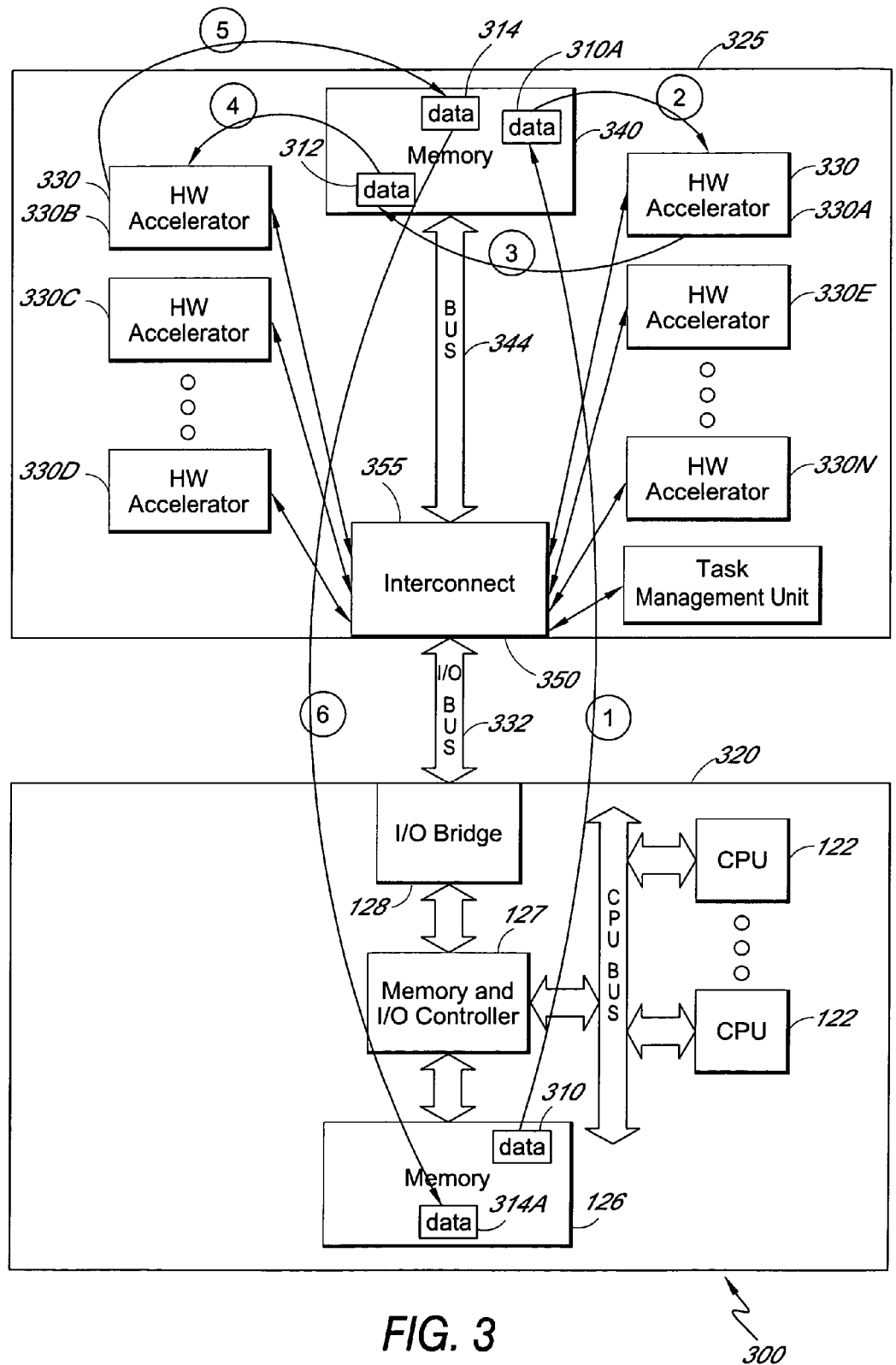
FIG. 3 is a functional block diagram illustrating a computing system including numbered arrows indicating data flow between a computing system and a circuit card assembly.

FIG. 3 illustrates a computing system 300 including numbered arrows indicating data flow paths between a computing system 320 and a circuit card assembly 325. The system of FIG. 3 is advantageously enabled to execute a succession of operations by multiple independent hardware accelerators 300, with each hardware accelerator 330 passing its output data to the next hardware accelerator 330 in succession without an intervening trip across the I/O bus 332, and without any hardware/software synchronization. In the embodiment of FIG. 3, the bandwidth of the I/O bus 332 is minimized because multiple operations may be performed by accelerators 330 with the data traveling only a single software-hardware-software round trip.

As shown in FIG. 3, an interconnect 350 is coupled to a task management unit ("TMU") 355 in the circuit card assembly 325. The TMU 355 provides intelligent routing of commands and data among components of the circuit card assembly 325. As will be explained in further detail below, the TMU 355 allows the execution of multiple commands by multiple accelerators 330 without intervention from the computing device 230 between operations. Thus, the configuration of the circuit card assembly 325 in FIG. 3 provides a more bandwidth and memory efficient acceleration device.

FIG. 3 includes numbered arrows indicating data flow between the computing device 320 and the circuit card assembly 325, where the numbers associated with each line are indicative of the order of the data movements. In step 1, the data 310 (e.g. the input file) to be operated upon is transmitted to the circuit card assembly 325 and stored in memory 340 as data 310A. The memory and I/O controller 127 accesses the input data 310 in the memory 126 of the computing device 320. In one embodiment, the memory and I/O controller 127 can include a DMAC. The memory and I/O controller 127 transmits the input data to the I/O bridge 128 so that the input data 310 can be communicated to the circuit card assembly. The I/O bridge 128 transmits the input data 310 across an I/O bus 332 to an interconnect 350 on the circuit card assembly 325. The interconnect 350 is bidirectionally coupled to multiple accelerators 130, a memory 140, and the TMU 355. Thus, communications between the computing device 320 in the software domain and the TMU 355 are via the interconnect. The interconnect 350 facilitates the transfer of input data 310 over the circuit card bus 344 to a location in memory 340. With the hardware configuration of FIG. 3, the TMU 355 may generate instructions for any of hardware accelerators 130, transmit the instructions to the hardware accelerators 130 via the interconnect 150, and allow the accelerators 130 to perform the requested operations by accessing the input data directly from memory 140.

In step 2, the data 310A is accessed by a first accelerator 330A. The first hardware accelerator 330A can access the data 310A directly or can access the data 310 via the TMU 355. The first hardware accelerator 330A then processes the input data 310A and produces output data or an output file.

In step 3, the first accelerator 330A stores an output file in the memory 340 as data 312. The first accelerator 330A can store the data 312 directly into memory 340 or can store the data 312 in memory 340 via the TMU 355.

In step 4, the data 312 is accessed by a second accelerator 330B, without the need of a command directly from the computing device 320. The second accelerator 330B receives the acceleration command from another component in the hardware domain, such as the TMU 355 or the first accelerator 330A. The second accelerator 330B operates on the data 312 output from the first accelerator 330A. The computing device 320 does not need to store the output data 312 from the first accelerator 330A in memory 126 before the second accelerator 330B process is initiated. The computing device 320 does not need to provide additional data for the second accelerator 330A. Thus, in the embodiment of FIG. 3, two steps of the process described in FIG. 2 (steps 4 and 5) are eliminated. Advantageously, two transmissions of the data across the I/O bus 332 are also eliminated. The operation of the computing system 300 in performing this process will be further described below with reference to FIG. 4. Thus, the second accelerator 330B accesses the data 312 stored in memory 340 and performs the acceleration process on the data 312 to produce an output file or output data.

In step 5, the accelerator 330B stores the output file in the memory 340 as data 314. In step 6, the data 314 is transmitted back to the computing device 320 and stored in the memory 126 as data 314A. The data 314 traverses substantially the reverse of the data path taken by the input data 310. The interconnect 350 or the interconnect 350 in conjunction with the TMU 355 accesses memory 340 and retrieves the data 314 using the circuit card bus 344. The interconnect 350 transmits the data 314 to the I/O bridge 128 using the I/O bus 332. The I/O bridge 128 transmits the data 312 to the memory and I/O controller 127 which stores the data 314 as data 314A in memory 126 within the computing device 320.

At this point, operations by two accelerators 130A and 130B have been performed on the original data 310. Thus, the embodiment of FIG. 4 reduces the I/O bandwidth requirements compared with that of FIG. 3. The embodiment of FIG. 4 additionally reduces the software overhead and system latency by performing two hardware acceleration operations with a single hardware/software synchronization.

Figure 4:
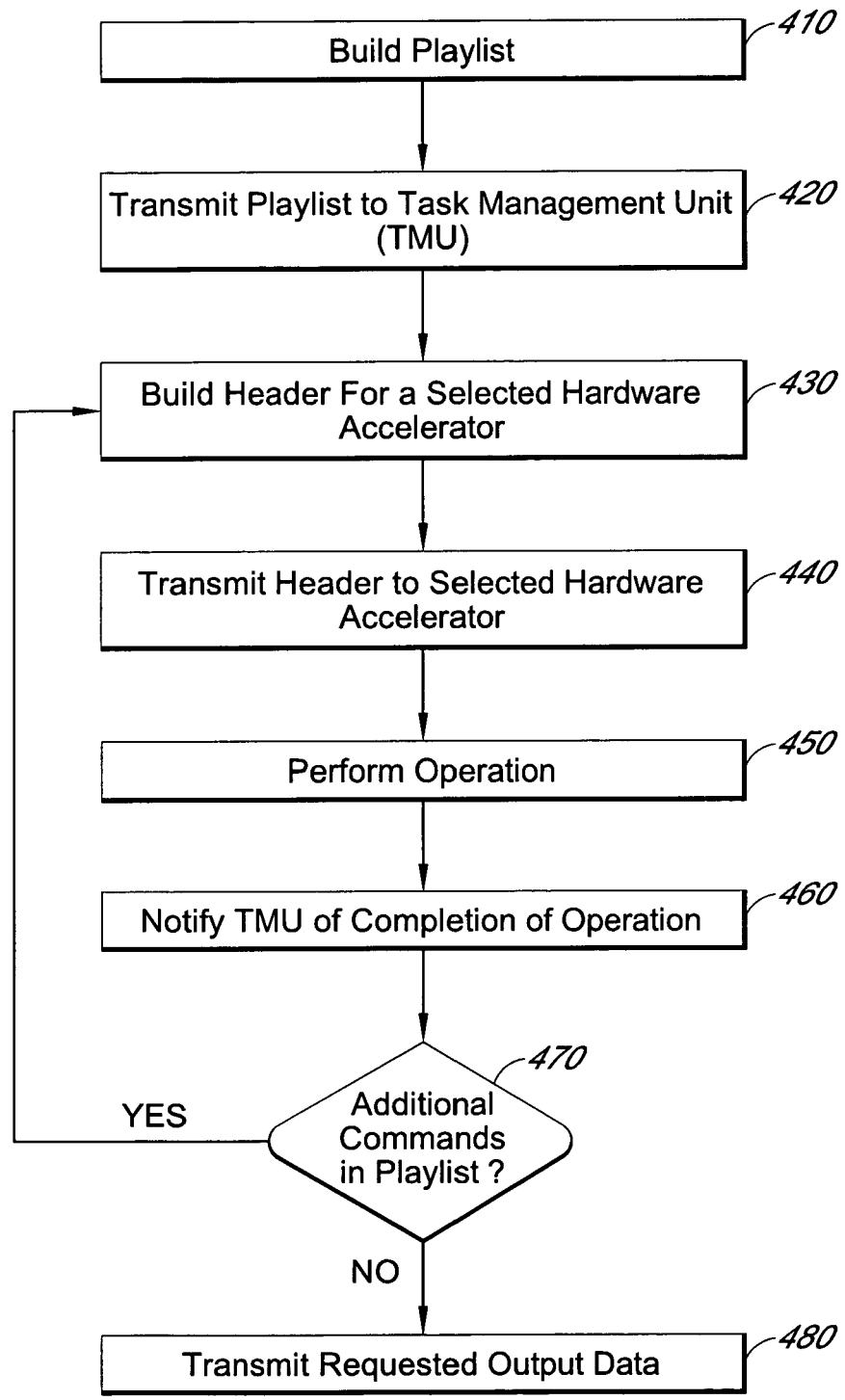
FIG. 4 is a flow chart illustrating a method of performing successive operations within the hardware domain without intermediate software intervention and with a single round trip of data across the I/O bus.

FIG. 4 is a flow chart illustrating a method of performing successive operations within the hardware domain without intermediate software intervention and with a single round trip across the I/O bus. The first two steps of the method illustrated in FIG. 4 are performed by the computing device 320 in the software domain, while the remaining steps are carried out by the circuit card assembly 325 in the hardware domain without any intervention from the software domain.

In block 410, the computing device 320 generates a data structure of commands to be performed by accelerators 330 in the hardware domain. In one embodiment, the data structure comprises a table. However, any type of data structure may be implemented according to the techniques described herein. Data structures are referred to herein gernerally as "tables," for convenience only. The term "table," should be broadly interpreted to include any other data structure. The processors 122 running software in the computing device 320 can generate the table of commands and store the table in memory 126. The table of commands, also referred to herein as a playlist, lists one or more of the accelerators 330A-330N and available acceleration command options for particular accelerators. The playlist also contains a memory address of data to be operated upon. A detailed description of the content, creation, and updating of the playlist is included below with reference to FIG. 5A.

In block 420, the computing device 320 transmits the playlist to the TMU 355 in the hardware domain. The processors 122 can transmit the playlist to the TMU 355. Alternatively, a DMAC or the memory and I/O controller 127 can retrieve the playlist from memory 126 and transmit the playlist to the TMU 355 via the I/O bridge 128 and I/O bus 332. The TMU 355 is coupled to each of the accelerators 330 via the interconnect 350 and is configured to provide instructions to each of the accelerators 330.

In one embodiment, the TMU 355 stores the playlist at a known location in the memory 340. The playlist may thereafter be accessed and modified by the TMU 355, or any accelerator 330. In another embodiment, the TMU 355 comprises a memory, such as a cache memory, and the playlist is stored in the memory of the TMU 355. In either embodiment, the playlist may be stored and updated at a static location or, alternatively, transmitted to various accelerators 330. In an advantageous embodiment, the TMU 355 accesses and updates the playlist in a memory and provides instructions to individual accelerators 330, based on the content of the playlist.

In block 430, the TMU 355 builds a header for a selected accelerator 330. A header, as used herein, is a standard set of data that instructs an accelerator to perform an operation on data. The header generally comprises an identification of a specific accelerator 330, any options for the operation to be performed by the specific accelerator 330, and a location and size of the data block to be operated upon. An exemplary header format is discussed below with reference to FIG. 6.

In block 440, the TMU 355 transmits the header to the accelerator 330 for which it was generated. For example, if a header is generated for accelerator 330A in block 430, the TMU 355 in block 440 transmits the header to accelerator 330A. Likewise, the TMU 355 transmits a header generated in block 430 for any accelerator 330N to the accelerator 330N.

In block 450 the accelerator 330 that received a header from the TMU 355 uses the information contained in the header to access the data in memory. The accelerator 330 can access the block of data, for example, via the interconnect

350. The accelerator 330 executes an operation or process on the block of data indicated in the header, and with the options indicated in the header. Any type of hardware accelerator 330 may be used in the circuit card assembly 325. In addition, any combination of types of accelerators 330 may be combined in a single circuit card assembly 325. For example, in one exemplary circuit card assembly 325, a decode, decompress, and antivirus hardware accelerator 330 may each be co-located on the circuit card assembly 325.

In block 460, the accelerator 330 that operated on the data transmits a signal to the TMU 355 indicating that the operation has been completed. In addition, the length and location of the output data may also be transmitted to the TMU 355. The TMU 355 may use the length and location of the output data in a header for a subsequent acceleration operation by another accelerator 330. Also, a result output, such as an indication of whether or not a virus was found in an operation performed by an antivirus accelerator 330, may be transmitted to the TMU 355 and/or to the computing device 320 in the software domain. For example, a block of data that is transmitted to a circuit card assembly 325 for a virus scan does not necessarily need to be retransmitted back to the computing device 320 after the virus scan is complete. Instead, the computing device 325 may only be interested in receiving a boolean indication of whether or not a virus was encountered. Thus, the output that is transmitted back to the computing device 320 may require much less bandwidth than the original block of data that was transmitted to the circuit card assembly 325.

In block 470, the TMU 355 determines if there are additional operations to be performed by accelerators 330 in the circuit card assembly 325. In one embodiment, this determination is performed by searching the playlist for any operations that have not yet been performed. If an operation is found in the playlist that has not yet been performed, the method returns to block 430 where the TMU 355 generates a header for transmission to another accelerator 330. In one embodiment, the operations in the playlist are executed in the order in which they are listed in the playlist. In another embodiment, the operations in the playlist are executed in an order determined by the TMU 355 according to a predetermined priority of operations table. In yet another embodiment, the TMU 355 determines an order of executing the operations based on other factors, such as a rules list that may be included in the playlist (see discussion of FIG. 5B, below).

In one embodiment, the TMU 355 receives a rules based playlist containing a list of instructions or rules that the TMU 355 may interpret in order to determine which accelerator 330 will perform the next operation. More particularly, the computing device 320 determines the desired results from the acceleration operations and generates rules for obtaining the results, which may be transmitted to the circuit card assembly 325 in the rules based playlist. In this embodiment, when an accelerator 330 completes an operation, the TMU 355 interprets the rules list to determine the next operation. In one embodiment, the rules list includes several choices based on one or more results from previous operations. For example, if a virus scan accelerator 330 returns results that indicate no viruses were identified in a particular input file, the rules may determine that the rules based playlist has been completed and return the virus scan results to the computing device 320. If, however, the virus scan accelerator 330 returns results indicating that viruses were found in the input file, the rules may determine that additional virus scanning or virus removal accelerators 330 should operate on the data.

In another embodiment, the rules based playlist may include one or more rules algorithms that methodically analyze one or more results from previous accelerators and determine the next acceleration operation that should be performed, if any (see FIG. 5B, below). In this way, accelerators 330 can be chained dynamically based upon the results of each operation. Additionally, the rules based playlist may contain certain requirements that must be met before operations may be performed by a particular accelerator. If the requirements have not been fulfilled, the rules based playlist may direct another accelerator 330 to perform an operation on the data, or alternatively, the rules based playlist may determine that an error message should be returned to the computing device 320. For example, the TMU 355 may determine that a decode operation may need to be performed on a block of data by a decode hardware accelerator 330, before the block of data may be scanned for viruses. Thus, the use of the decode accelerator 330 is in response to the rules based playlist which includes a requirement that all encoded data must first be decoded using a decode accelerator 330. Accordingly, the TMU 355 may dynamically perform the decode operation by generating and transmitting an appropriate header to the decode accelerator 330.

If, in block 470, the TMU 355 determines that there are no algorithmic operations remaining to be performed on the block of data, the method continues to block 480 where output data is transmitted from the memory 340 to the computing device 320 via the interconnect 350 and I/O bus 332. In one embodiment, the output data is substantially the same size as the original block of data received in block 420, but with certain bits that have changed in the process of performing algorithmic operations by hardware accelerators 330. In another embodiment, the output data may be transformed significantly from the original input data. For example, graphic data may have been decompressed and rendered. In another embodiment, the output data comprises one or more flag bits that are indicative of the results of one or more of the operations executed by the accelerators 330.

Figure 5A:
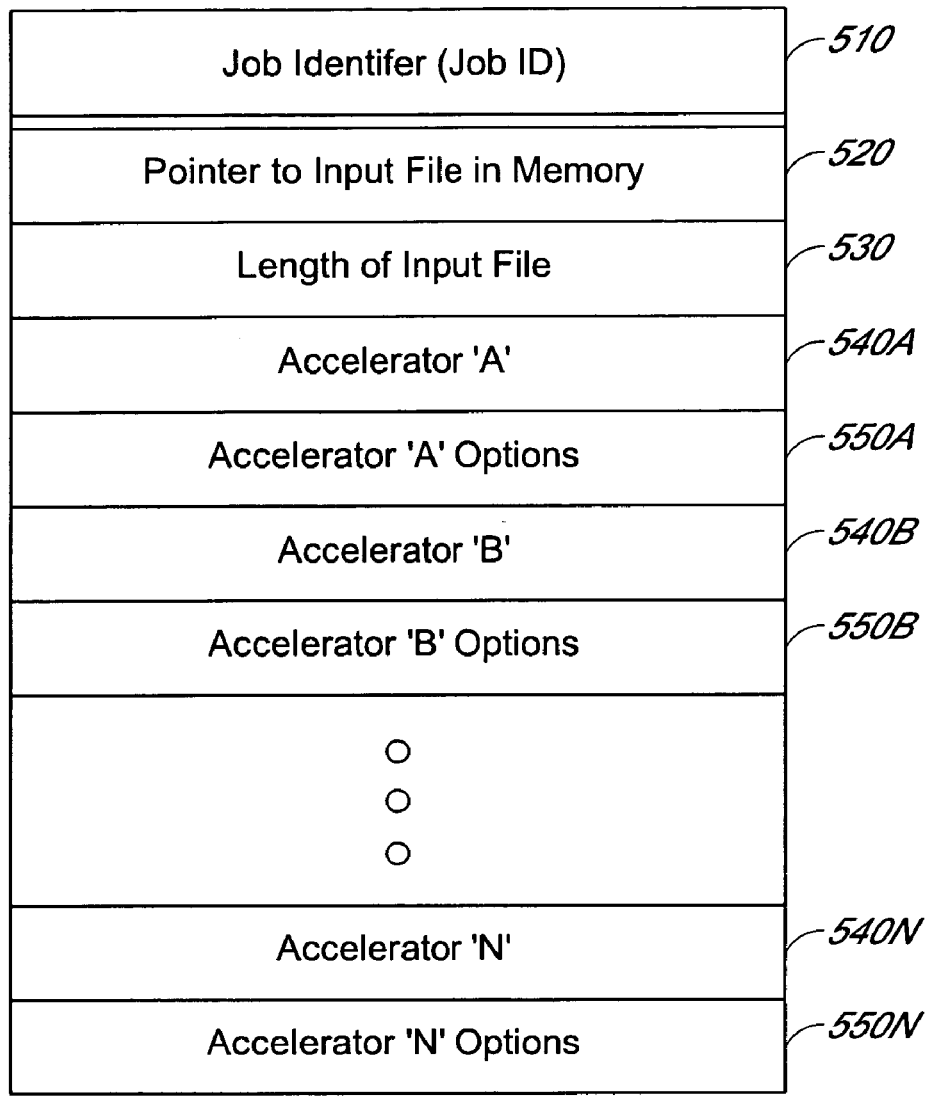
FIG. 5A is a table illustrating an exemplary playlist containing instructions for multiple accelerators to perform multiple operations on a block of data.

FIG. 5A is a table illustrating an exemplary playlist 500 containing instructions for multiple accelerators to perform multiple operations on a block of data. The playlist 500 may be organized in any manner and many include more or less data identifiers than are illustrated in FIG. 5A. The playlist 500 includes a job identifier (ID) 510 that uniquely identifies the current job to be performed. In one embodiment, each playlist 500 has a unique job ID 510 and is associated with one or more operations to be performed on a block of data. The job ID 510 allows the TMU 355 to receive and manage multiple playlists 500 concurrently without confusion. For example, the TMU 355 may transmit headers, including instructions for the execution of operations on blocks of data, corresponding with commands listed in multiple playlists, to multiple accelerators 330 within the circuit card assembly 325.

The playlist 500 includes an address field that stores a pointer 520 that is indicative of an address of an input file in memory. The playlist 500 can use any method of addressing and is not limited to having a pointer to an address. For example, the playlist can include a field that uses direct or indirect addressing to identify an address of an input file or an address of a register that stores the address of the input file. As discussed above, the computing device 320, executing software, organizes the memory in the software domain such that it can be copied to the circuit card assembly 325, in the hardware domain. Thus, the block of data to be operated on is organized in a memory at the computing device 320 before the playlist 500 is transmitted to the circuit card assembly 325. When the TMU 355 receives the playlist 500, including the pointer 520 to the input file, the TMU 355 may initiate a memory access command in order to transfer the input file from the memory location in the computing device 320 to the circuit card assembly 325.

The playlist 500 includes a file length field 530 that indicates the length of the input file to be operated upon. In one embodiment, the file length filed 530 includes a single number that indicates the number of bytes in the current input file. In another embodiment, the file length filed 530 may contain the end address of the input file in memory.

The playlist 500 includes any number of accelerator fields 540 identifying accelerators. Additionally, accelerator option fields 550 can be associated with each of the accelerator fields 540. For example, the exemplary playlist of FIG. 5A lists, an accelerator A in a first accelerator field 540A, an accelerator B in a second accelerator field 540B, and an accelerator N in an Nth accelerator field 540N. In one embodiment, each of the accelerators listed in the corresponding accelerator fields 540 (e.g. accelerator fields 540A, 540B, and 540C) are accelerators that perform different algorithmic operations on the input file. For example, the accelerator identified in the first accelerator field 540A may be a decompressor that decompresses the input file. The accelerator identified in a second accelerator field 540B may be a virus scanner that scans the input file for viruses. The accelerator identified in a third accelerator field 540C may compile the virus scan results from accelerator identified in the second accelerator field 540B for output to the software domain. In another embodiment, the same accelerator may be listed in a playlist 500 at two different locations. For example, the accelerator listed in a first accelerator field 540A may be listed in two or more accelerator fields of the playlist 500 such that the input data is operated upon twice by the accelerator.

The accelerator options fields 550 contain one or more options for each particular accelerator. For example, if the accelerator identified by a first accelerator field 540A is a decompression accelerator, the accelerator options field SSOA may contain one or more pieces of data indicative of the type of decompression to be performed on the input file.

In one embodiment, the TMU 355 creates the headers for the accelerators identified in the accelerator fields 540 in the playlist 500 according to the order listed in the playlist 500. In another embodiment, the TMU 355 may determine the order of operations performed by the accelerators listed in the accelerator fields 540 according to a rules based playlist. For example, a TMU 355 may determine that an acceleration operation does not need to be performed, based on the results of previous acceleration operations, by various accelerators. Accordingly, the TMU 355 may skip the unnecessary acceleration operation and continue with the next accelerator as required by the rules contained in the rules based playlist.

In another embodiment, the TMU 355 may re-order the execution of operations by the accelerators listed in the playlist according to the current availability and demand for particular accelerators. However, one of skill in the art will recognize that the order of the operations cannot be arbitrarily rearranged in every case. The TMU 355 may receive an input from the computing device 320, either as part of the playlist 500, a rules based playlist, or a separate instruction, indicating the operations that may be executed out of order. Alternatively, the TMU 355 may intelligently determine, based on the types of accelerators 540 in the playlist 500 and the options 550 associated with the listed accelerators 540, that changes in the order of operations are possible.

Figure 5B:
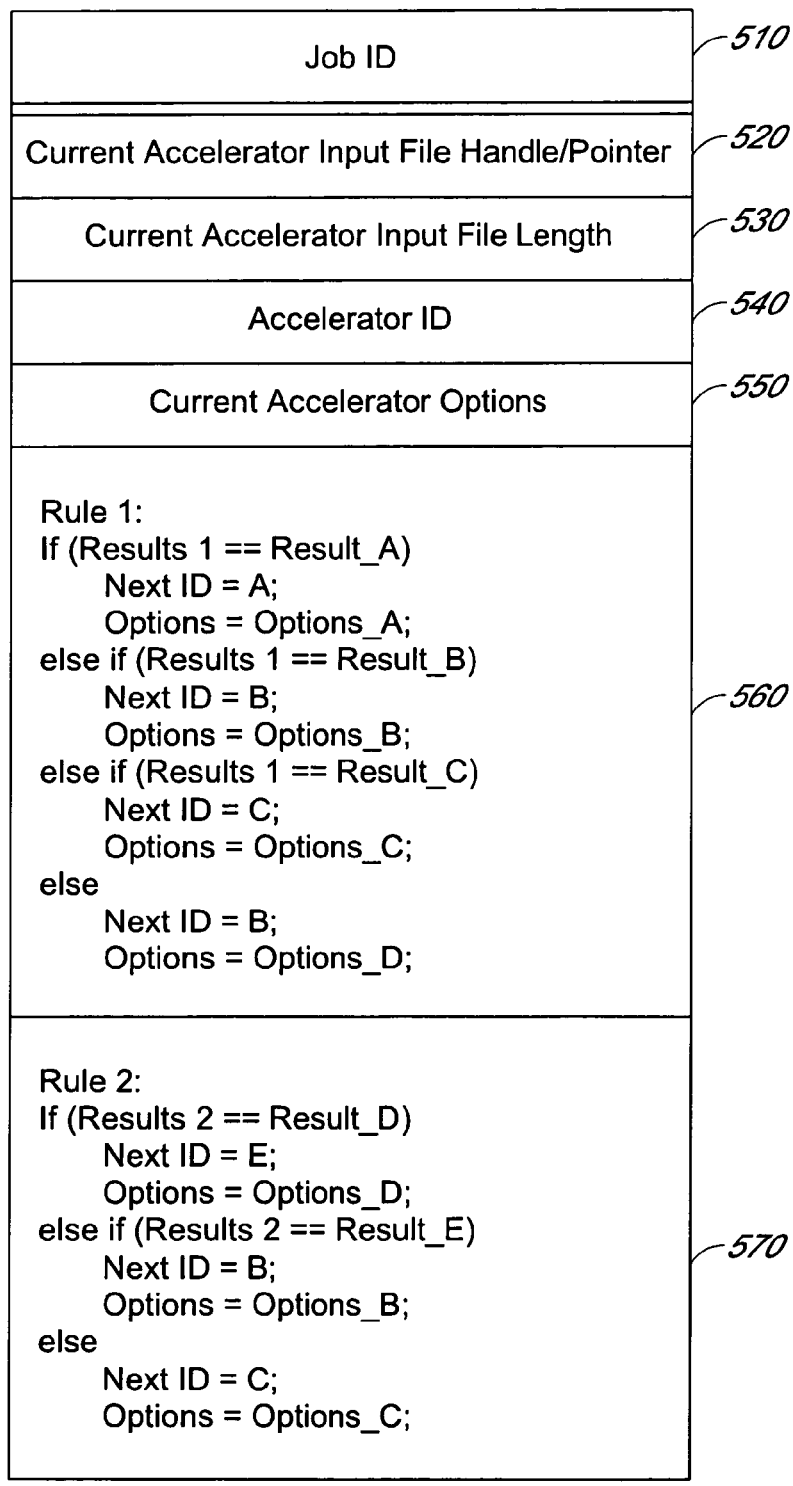
FIG. 5B is a table illustrating an exemplary rules based playlist containing a rules list for dynamically determining, in the hardware domain, the acceleration operations to be performed on a block of data.

FIG. 5B is a data structure, and more particularly, a table, illustrating an exemplary rules based playlist 580 containing a rules list for dynamically determining, in the hardware domain, the acceleration operations to be performed on a block of data. The use of a rules based playlist 580 further offloads CPU time from the software domain by allowing the circuit card assembly 325 to analyze results from accelerators 330 and determine any additional acceleration operations to be performed. Similar to the playlist illustrated in FIG. 5A, the exemplary rules based playlist 580 includes a job ID 510, an address field that stores a pointer 520, and a file length filed 530 that indicates the length of the input file to be operated upon. The rules based playlist 580 additionally includes a current accelerator field 540 and a current accelerator options field 550.

The circuit card assembly 325 performs the acceleration operation indicated by the accelerator 330 in the accelerator field 540 with the options indicated in the accelerator options field 550. When the operation has been completed, the TMU 355 evaluates the Rule 1 list 560, according to the results of the algorithmic operations perform by the accelerator 330 indicated in the accelerator filed 540, in determining which accelerator 330 should next operate on the data. 5B illustrates a rules list that is structured similar to a computer program written in C++. One of skill in the art will recognize that the rules list may be generated and sent in any format that is understandable by the TMU 355. Thus, a TMU 355 may be configured to evaluate logical commands in any format or syntax desired. The exemplary rules based playlist 580 requires the use of only three logical operations (e.g. If, else if, and else).

In one exemplary embodiment, the circuit card assembly 325 operates such that the TMU 355 evaluates the results of the algorithmic operation perform by the accelerator 330 indicated in the accelerator filed 540, according to the rules listed in the Rule 1 list 560 and in the Rule 2 list 570. Accelerators A, B, C, D and E may be any one of the accelerators 330 illustrated in FIG. 3. For example, accelerator A may be, for example, accelerator 330A and accelerator B may be accelerator 330B. According to the exemplary Rule 1 list 560 of FIG. 5B, if the results (Results1) meet a first criteria (Results1=Result_A), an operation will next be performed by an accelerator A (NextID=A) with options selected for accelerator A (Options=Options_A). However, if the results (Results1) fail to meet a first criteria (Results1=Result_A), but do meet a second criteria (Results1=Result_B), an operation will next be performed by an accelerator B (NextID=B) with options selected for the accelerator B (Options=Options_B). Similarly, if the results (Results1) fail to meet a first criteria (Results1=Result_A) and a second criteria (Results1=Result_B), but do meet a third criteria (Results1=Result_C), an operation will next be performed by an accelerator C (NextID=C) with options selected for the accelerator C (Options=Options_C). Finally, if the results (Results1) fail to meet a first criteria (Results1=Result_A), a second criteria (Results 1=Result_B), and a third criteria (Results1=Result_C), the next operation will be performed by an accelerator D (NextID=D) with options selected for the accelerator D (Options=Options_D). The TMU 355 builds a header for the accelerator indicated by the logical commands of Rule 1 list 560. When the selected operation has been completed the results are stored as Results2 and are evaluated by the Rule 2 list 570 in determining the subsequent accelerator operation. Alternatively, a rules list may include looping syntax, such as do . . . while or loop . . . until, so that the a particular rules list, such as Rule 1 list 560, may evaluate results multiple times.

For example, the accelerator ID 540 may be a decode accelerator. After the decode operation is performed, the decoded input file is stored in the memory 340. The TMU 355 accesses the file stored in memory 340 and determines which operations listed in Rule 1 list 560 should next be executed. Each of the comparisons with Results1 data may determine what type of file is in the Results1 data. For example, the Result_A may represent an image file (e.g. .jpg, .gif, .tif), the Result_B may represent an executable file (e.g. .exe), and the Result_C may represent a compressed file (e.g. .zip, .rar, .hqx). The accelerators A, B, C, and D may perform different types of antivirus or decompression operations that are suitable for specific file types. For example, if the Results1 data is determined to include an image file (e.g. Results1=Result_A), the TMU 355 will generate a header for accelerator A, which may be an image decompression and/or optimization accelerator. Likewise, if the Results1 data is determined to include an executable file (e.g. Results1=Result_B), the TMU 355 will generate a header for accelerator B, which may be an antivirus accelerator, and the options_B may indicate a particular set of virus scans that are most necessary for an executable file. Alternatively, the options_B may simply indicate that the data file is an executable, and the antivirus accelerator B may determine the appropriate virus scan to be performed on the data. Similaryly, if the Results1 data is determined to include a compressed file (e.g. Results1=Result_C), the TMU 355 will generate a header for accelerator C, which may be a decompression accelerator, and the options_B may indicate a particular compression type used on the compression file. If the data file is not any of an image, executable, or compressed file, the TMU 355 will generate a header for accelerator B with options_D. As noted above, in this example accelerator B is an antivirus accelerator. Options_D contains options for the antivirus accelerator that are appropriate for scanning a file of unknown type. For example, a complete virus scan may be completed on the data file.

The Rule 2 list 570 contains similar logical commands to those discussed with reference to the Rule 1 list 560. As illustrated in the Rule 2 list 570, the results from the acceleration operation determined in the Rule 1 list 560 (Results2) are evaluated against additional criteria (Result_D and Result_E). In one embodiment, the Rule 2 list 570 may evaluate the Results1 in addition to the Results2 in determining the next acceleration operation to be performed, if any.

The rules based playlist 580 is provided as an example of a playlist that may be used to evaluate data and perform logical operations in dynamically determining further operations. One of skill in the art will recognize that there are countless syntaxes, operations, and programming structures that may be implemented in generating a rules based playlist 580. One of skill in the art will additionally recognize that there are countless attributes of a data file that may be evaluated according to the logical operations of a rules list. For example, file type, file length, and compression type may be evaluated by a TMU 355 executing a rules list.

Figure 6:
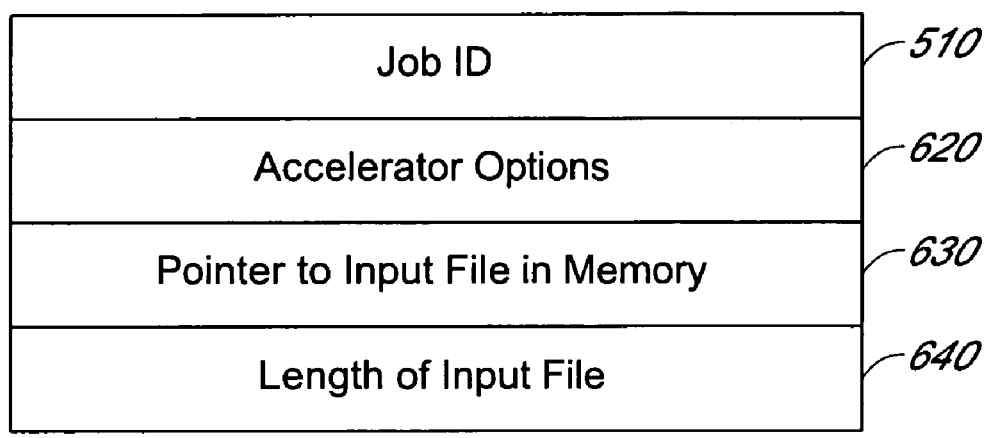
FIG. 6 is a diagram illustrating an exemplary header containing instructions for a single accelerator to perform an operation on an input file.

FIG. 6 is a table illustrating an exemplary header 600 containing instructions for a single accelerator to perform an operation on an input file. The exemplary header 600 includes the job ID 510, the accelerator options 620, pointer 630 to the input file, and the file length 640.

As discussed above, the job ID 520, also referred to as a playlist ID, uniquely identifies the current job to be performed. Each job 520 is associated with a playlist 500 that includes one or more operations to be performed on a block of data.

The accelerator options 620 are generated based on the accelerator options 540 in the playlist 500 for the particular accelerator identified in an accelerator field 540 for which the header is generated. For example, if the accelerator for which the header is generated is a decode accelerator, the options may include, but are not limited to, the type of decoding to use on the data file, such as bin-hex (macintosh), base-64 (windows), or uu-decode (unix), for example. Additionally, the options 620 may notify the decode accelerator that the file header is in a standard format or that the accelerator should interpret the header.

In one embodiment, the header 600 contains a copy of the options 550 in the playlist 500. For example, when generating a header 600 for the accelerator 540B, the accelerator options 620 may be identical to the accelerator options 550B. In another embodiment, the TMU 355 may adjust one or more of the options 550B according to results from previous operations performed on the input file, for example, in accordance with a rules list in a rules based playlist.

The pointer 630 directed to the input file contains the start memory address of the data to be operated upon. In one embodiment, each of the accelerators performs algorithmic operations on a block of data and stores the results of the operations in memory. However, the output file (e.g. the result of the algorithmic operation performed on the input file) is stored at a different location in memory than the input file. Thus, in an advantageous embodiment, the pointer 630 for each accelerator identified in an accelerator field 540 (other than accelerator identified in a first accelerator field 540A) is the address of the output file from the previous accelerator. For example, when building a header for an accelerator identified in a second accelerator field 540B, the pointer 630 is set to the address of the output file from the accelerator identified in the first accelerator field 540A.

With reference to FIG. 3, it is shown that the original input file data 310A is stored in memory 340 at a first location. After the accelerator 330A performs an algorithmic operation on the data 310A, an output file is stored in memory 340 as data 312, at a second location. Thus, the pointer 630 included in the header 600 for accelerator 330B is set to the location of data 312 (the second location in memory 340), rather than the location of the original data 310A.

The file length 640 contains the length of the data block to be operated upon. For example, the file length 640 may include the number of bytes in the data block or, alternatively, the end address in memory of the data block. The file length 640 may change from one accelerator to the next in the same playlist 500 as the length of the data block may change as different algorithmic operations are performed. For example, a decompression operation will result in an output data block that is larger than the input data block.

FIGS. 5 and 6, along with the related discussion herein define an exemplary system and method of implementing the described hardware acceleration techniques. It will be recognized by one of skill in the art that other methods of communicating instructions to multiple hardware accelerators in a circuit card assembly may be used in conjunction with the techniques described herein. For example, in one embodiment, the accelerators 330 may communicate with one another. In this case, the TMU function is decentralized such that each accelerator 330 operates on the playlist in succession and builds the header for the next accelerator in the chain. Thus, in one embodiment, there is not a separate TMU 355, but instead each of the accelerators 330 contains some of the TMU 355 logic and accesses the playlist 500. For example, when the accelerator identified in a first accelerator field 540A in a playlist 500 has completed the requested algorithmic operation, the first accelerator may communicate directly with the accelerator identified in a second accelerator field 540B. In one embodiment, the first accelerator may generate a header for the second accelerator indicating the acceleration options as well as the location and size of the data file. The second accelerator, after completing the requested operation, may then communicate the same data to a next accelerator in the playlist 500.

In another embodiment, the current hardware accelerator executes the given command with input data and size indicated by the entries in the playlist. The current hardware accelerator edits the playlist for the next hardware accelerator in the chain by moving the next accelerator ID into the current accelerator ID. The current accelerator may also set a file pointer and file length fields according to the output file of the current accelerator. The next accelerator options field must also be moved to the current accelerator options field in the playlist. Thus, all of the current acceleration information relates to the next operation to be performed. In one embodiment, all of the data associated with the current accelerator is stored at the end of the playlist. The current accelerator then sends a synchronizing command to the next accelerator using the accelerator ID supplied. In this way, each command is executed by the associated hardware accelerator until a Null ID, or other indicator in the playlist, is encountered. This indicates the end of processing and the data is returned to the software domain.

In still another embodiment, each hardware accelerator can accept and transmit synchronization messages from either software or from another hardware accelerator. This allows the hardware accelerator to be part of a chained operation where its input and/or output data is from/to another accelerator or part of a non-chained operation where it communicates directly with software. This provides flexibility for operations that require one operation only. In one embodiment, each hardware accelerator recognizes a common or standard data structure for passing the necessary input/output locations and command information described previously. Accordingly, if a standard command structure is implemented, any accelerator may communicate with any other accelerator.

Figure 7:
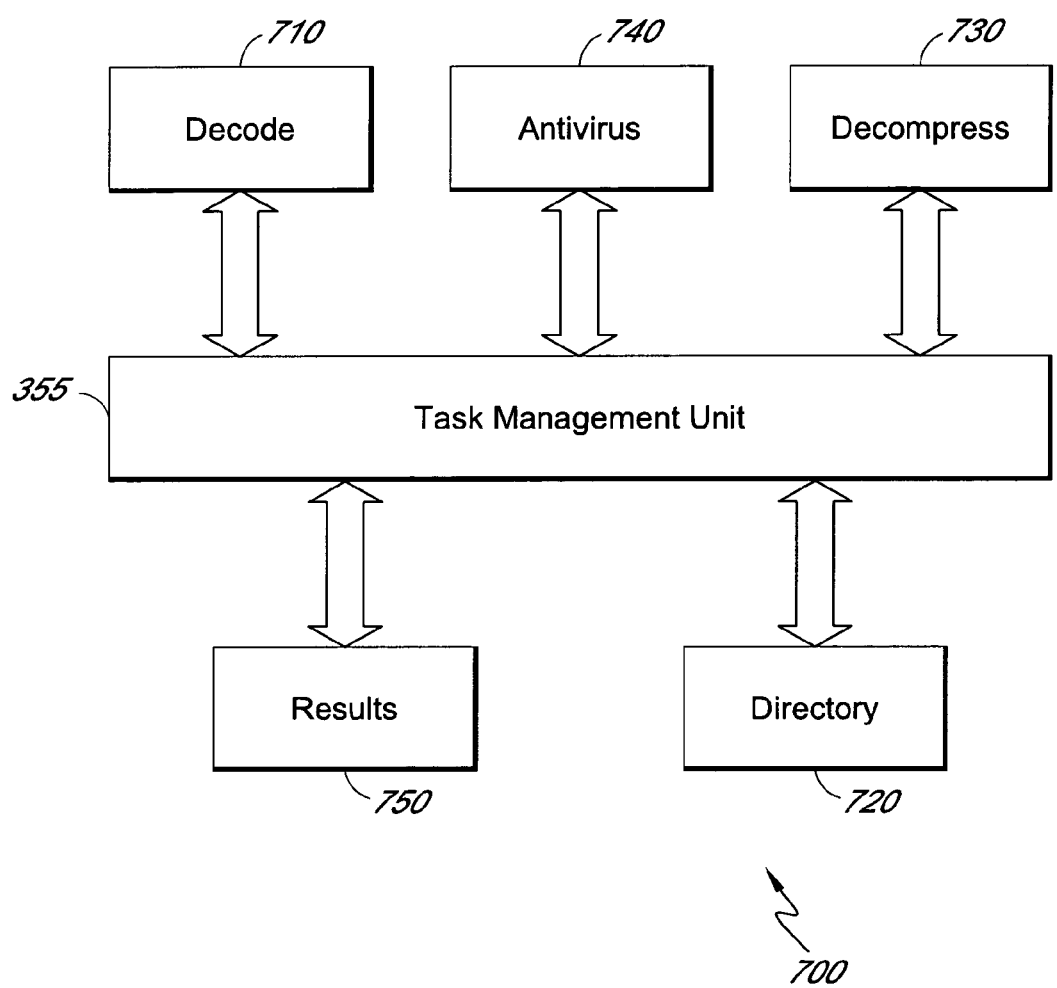
FIG. 7 is a block diagram of a circuit card assembly comprising multiple hardware accelerators.

FIG. 7 is a block diagram of a circuit card assembly 325 comprising multiple hardware accelerators. In accordance with the technique described herein, the TMU 355 receives a playlist 500 from the software domain and builds headers 600 for each of a plurality of accelerators 710, 720, 730, 740, and 750. In one embodiment, the playlist 500 transmitted to the TMU 355 includes five accelerators identified in five accelerator fields 540 and five sets of options 550 associated with the accelerators. More particularly, in the exemplary arrangement of FIG. 7, the playlist 500 lists the five accelerators in the following order: decode accelerator 710, directory accelerator 720, decompress accelerator 730, antivirus accelerators 740, and results accelerator 750. The decode accelerator decodes the input file, according to options, such as the type of coding used, specified in a received header. The directory accelerator 710 interprets multi-file compressed archives and outputs multiple compressed files. Options associated with the directory accelerator 710 may include, for example, the number of levels in hierarchary to separate into individual files and an indicator of an action if a corrupted file is encountered, e.g. either to stop the operation or continue with the uncorrupted files. Options associated with decompress accelerator 730 may include, for example, the type of compression used on the file, such as pkunzip, zip, rar, ace, sit, or Lempel-Ziv. Additionally, the decompress accelerator 730 options may include various output options, such as the maximum length of an output file or an indication of whether or not a CRC check should be performed on the decompressed files.

In one embodiment, a maximum length for an output file may be appropriate, such as where a subsequent antivirus accelerator examines only a first predetermied number of bytes of the output file. The antivirus accelerator 740 in FIG. 700 scans non-encoded, non-compressed files for viruses. Options associated with the antivirus accelerator 740 may include an indication of the type of the data file or the type of virus scanning to perform. For example, if the file extension is .exe, the antivirus accelerator 740 may scan for additional and/or different types of viruses that it would for other file types.

The results accelerator 750 interprets and sorts results from the previous accelerator operations. The results accelerator 750 formats the data according to the options included in the received header. For example, the results accelerator 750 may receive files directly from multiple accelerators that are to be examined in compiling the results. Additional options may include, but are not limited to, an indicator of whether the original data should be returned to the computing device 320 and what types of results should be returned to the computing device. For example, in one embodiment, the options may indicate that virus scan results returned to the computing device 320 comprise a single data bit indicating whether or not there was a virus found. Alternatively, the options may indicate that virus scan results should be detailed, including the specific virus located and the position of the virus located.

In the embodiment of FIG. 7, the TMU 355 first generates a header for the decode accelerator 710 using the pointer 520 and file length 530 in the playlist. After the header for decode accelerator 710 has been generated, the TMU 355 may determine if the decode accelerator 710 is available to perform the requested operation. If the accelerator is busy, the decode acceleration operation may be queued. In one embodiment, the TMU 355 maintains a queue for each of the accelerators in the circuit card assembly 325. Thus, at any time, the TMU 355 knows what jobs (associated with job ID's 510 and playlists 500) are being executed by each accelerator in the circuit card assembly 325.

With reference to the exemplary arrangement of FIG. 7, the TMU 355 may maintain a queue for each of the accelerators, such as the decode accelerator 710, for example. In this embodiment, the header generated by the TMU 355 for the decode accelerator 710 may be stored at the TMU 355 until the current job reaches the top of the queue. Alternatively, each of the accelerators may include a memory for storing a list of queued headers, either in a memory at the accelerator or at the memory 340 of the circuit card assembly 325.

After the decode accelerator 710 performs the requested decode operation, with the options 620 indicated in the header, an output file is stored in the memory 340 of the circuit card assembly 325. The location and length of the output file is then transmitted to the TMU 355. Reception by the TMU 355 of the memory address and length of the output file from the UU decode accelerator 710 indicates that the decode operation is complete and the next operation in the playlist may be executed. In the example of FIG. 7, the playlist 500 indicates that a directory operation should next be performed on the data. Thus, the TMU 355 generates a header for the directory accelerator 720, including the memory address and length of the data output from the decode accelerator 710 as the pointer 630 and file length 640 of the header 600. As with the decode accelerator 710, the directory accelerator 720 may not be able to immediately perform the operation in the header 600, and the job ID 510 and other header information may be stored in a queue. The directory accelerator 720 performs the requested operation on the data. The TMU 355 receives a signal that the directory accelerator 720 has completed operations on the data and the TMU 355 generates a header for the next accelerator in the playlist. The process of generating headers and performing hardware acceleration operations continues in the hardware domain until each of the operations in the playlist is performed.

Specific parts, shapes, materials, functions and modules have been set forth, herein. However, a skilled technologist will realize that there are many ways to fabricate the system of the present invention, and that there are many parts, components, modules or functions that may be substituted for those listed above. While the above detailed description has shown, described, and pointed out the fundamental novel features of the invention as applied to various embodiments, it will be understood that various omissions and substitutions and changes in the form and details of the components illustrated may be made by those skilled in the art, without departing from the spirit or essential characteristics of the invention.

What is claimed is:

1. A hardware accelerator module comprising:
   a plurality of hardware accelerators configured to perform algorithmic operations on data;
   an interface configured to couple the hardware accelerator module to a computing device such that the hardware accelerator module is removably attachable to the computing device, the computing device being configured to execute software and receive an input file;
   a data transmission path extending between the plurality of hardware accelerators; and
   a task management unit configured to receive a data structure comprising indications of a plurality of operations to be performed on the input file by the plurality of hardware accelerators, the data structure being generated by the computing device prior to execution of any of the plurality of operations by respective of the hardware accelerators, wherein the plurality of operations are determined based at least partly on one or more characteristics of the input file, the task management unit being further configured to originally generate headers indicating respective algorithmic operations to be performed by the respective hardware accelerators for transmission to respective hardware accelerators;
   wherein said data structure and said input file are received from the computing device via the interface and each of said plurality of operations are executed by the hardware accelerator module independent of additional communication with said computing device.

2. The hardware accelerator module of claim 1, wherein said data transmission path comprises a data communication bus.

3. The hardware accelerator module of claim 1, wherein the data structure comprises a table.

4. The hardware accelerator module of claim 1, wherein said data structure comprises a plurality of acceleration options associated with each of the plurality of operations to be performed by the plurality of hardware accelerators.

5. The hardware accelerator module of claim 1, wherein said data structure comprises a memory address of an input file, and wherein said plurality of operations are executed on said input file.

6. The hardware accelerator module of claim 5, wherein said data structure comprises a length of the input file.

7. The hardware accelerator module of claim 1, wherein each of the plurality of hardware accelerators comprises one of a field programmable gate array, an application specific integrated circuit, and a custom integrated circuit.

8. The hardware accelerator module of claim 1, wherein said interface comprises one of an advanced graphics port and peripheral component interconnect.

9. A method of performing a plurality of algorithmic operations by a plurality of hardware accelerators co-located on an acceleration card and having a connection path extending between the hardware accelerators on the acceleration card, the acceleration card configured to be removably coupled with a computing system the method comprising:
   receiving a playlist from the computing system, the playlist indicating at least two operations to be performed on a block of data;
   receiving at the hardware acceleration card the block of data;
   originally generating at the hardware acceleration card a first command header indicating a first of the plurality of hardware accelerators that should perform a first algorithmic operation indicated in the playlist on the received block of data;
   in response to receiving the first command header at the first of the plurality of hardware accelerators, performing at the first of the plurality of hardware accelerators the first algorithmic operation on the block of data, so as to form a first operated block of data;
   storing the first operated block of data on the acceleration card;
   originally generating at the hardware acceleration card a second command header indicating a second of the plurality of hardware accelerators that should perform a second algorithmic operation indicated in the playlist on the first operated block of data; and
   in response to receiving the second command header at the second of the plurality of hardware accelerators, performing at the second of the plurality of hardware accelerators the second algorithmic operation on the stored first operated block of data, so as to form a second operated block of data.

10. The method of claim 9, further comprising:
    storing the second operated block of data on the acceleration card; and
    performing at a third of the plurality of hardware accelerators a third algorithmic operation on the second operated block of data, so as to form a third operated block of data.

11. The method of claim 10, further comprising:
    storing the third operated block of data on the acceleration card; and
    performing at a fourth of the plurality of hardware accelerators a fourth algorithmic operation on the third operated block of data, so as to form a fourth operated block of data.

12. A method of executing a plurality of commands by a plurality of hardware accelerators disposed on a circuit card assembly, the method comprising:
    (a) receiving at the circuit card assembly a list indicating a plurality of commands to be performed by respective hardware accelerators, the list being received from a computing system having a CPU, a bus, and an I/O interface coupling the circuit card assembly with the computing system;
    (b) processing at the circuit card assembly the received list so as to determine commands to be performed by respective of the plurality of hardware accelerators;
    (c) transmitting a command header this is originally generated at the circuit card assembly to one of the plurality of hardware accelerators that is specifically configured to perform a command indicated in the command header;
    (d) performing the one of the plurality of commands by the one of the plurality of hardware accelerators;

(e) updating the plurality of commands by removing the one of the plurality of commands performed by the one of the plurality of hardware accelerators from the plurality of commands;

(f) determining whether additional commands are present in the plurality of commands; and (g) if additional commands are present in the plurality of commands, returning to step (b), wherein steps b-g are performed at the circuit card assembly without receiving further information from the computing system regarding processing of the received list.

13. A method of performing a plurality of algorithmic operations by a plurality of hardware accelerators co-located on an acceleration card, the acceleration card being removably coupled with a computing device, the method comprising:

originally generating at the acceleration card a first command header for a first of the plurality of hardware accelerators;

executing an algorithmic operation by the first of the plurality of hardware accelerators on data indicated in the first command header, thus generating a first operated block of data;

storing the first operated block of data on the acceleration card;

originally generating at the acceleration card a second command header for a second of the plurality of hardware accelerators; and executing an algorithmic operation by the second of said plurality of hardware accelerators on the first operated block of data generating a second operated block of data.

* * * * *